(12) United States Patent
Tomi et al.

(10) Patent No.: US 6,399,163 B1
(45) Date of Patent: Jun. 4, 2002

(54) LIQUID CRYSTAL COMPOSITION AND LIQUID CRYSTAL DISPLAYS

(75) Inventors: Yoshitaka Tomi; Kanetsugu Terashima; Hitoshi Yamamoto, all of Shiga; Hiroaki Kawashukuda, Chiba, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/582,793
(22) PCT Filed: Nov. 4, 1999
(86) PCT No.: PCT/JP99/06133
§ 371 Date: Jul. 5, 2000
(87) PCT Pub. No.: WO00/27947
PCT Pub. Date: May 18, 2000

(30) Foreign Application Priority Data

Nov. 5, 1998 (JP) .............................. 10-314523

(51) Int. Cl.[7] ......................... C09K 19/34; C09K 19/30; C09K 19/20
(52) U.S. Cl. ............. 428/1.1; 252/299.61; 252/299.63; 252/299.67
(58) Field of Search ....................... 428/1.1; 252/299.61, 252/299.63, 299.66, 299.67

(56) References Cited

U.S. PATENT DOCUMENTS 6,146,719 A * 11/2000 Poetsch et al. ................... 1/1

FOREIGN PATENT DOCUMENTS

| JP | 9-71779 | 3/1997 |
| JP | 9-241645 | 9/1997 |
| WO | 96/23851 | 8/1996 |
| WO | 97/05214 | 2/1997 |

* cited by examiner

*Primary Examiner*—Shean C. Wu
(74) *Attorney, Agent, or Firm*—Wenderoth, Lind & Ponack, L.L.P.

(57) ABSTRACT

A liquid crystal composition comprising at least one compound expressed by formula (1) as the first component, at least one compound expressed by formula (2) as the second component, and at least one compound expressed by either formula (3-1) or (3-2) as the third component.

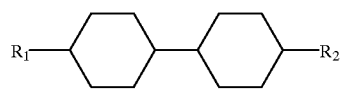

(1)

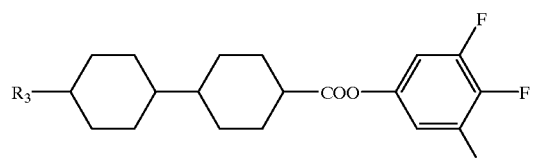

(2)

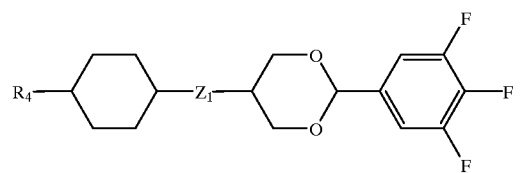

(3-1)

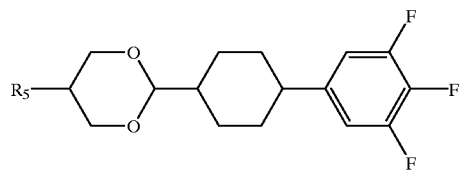

(3-2)

wherein $R_1$, $R_3$, $R_4$, $R_5$ and $R_6$ each independently represent alkyl having 1 to 10 carbon; $R_2$ represents alkyl or alkoxy having 1 to 10 carbon, or —COO—$R_6$; $Z_1$ represents a single bond or —$C_2H_4$—.

8 Claims, No Drawings

LIQUID CRYSTAL COMPOSITION AND LIQUID CRYSTAL DISPLAYS

This application is a 371 application of PCT/JP99/06133 filed Nov. 4, 1999.

TECHNICAL FIELD

The present invention relates to a nematic liquid crystal composition. More specifically, the invention relates to a liquid crystal composition for an active matrix liquid crystal display device and to a liquid crystal display device using the liquid crystal composition.

BACKGROUND ART

To date, a transmission-type active matrix liquid crystal display device (AM-LCD) using a backlighting as a light source has been used practically as a device enabling full color display. As this backlighting has a weak point to consume considerable electric power, a digital still camera and a digital video camera equipped with such AM-LCD have an inconvenience that they cannot be used for a long time.

To solve the problem of the electric power consumed, a reflection-type AM-LCD has been developed. In the reflection-type AM-LCD, as reported by S.-T. Wu, C.-S. Wu, C.-L. Kuo et al. in SID 97 Digest/643, light passes twice through a liquid crystal layer so that the product ($\Delta n \cdot d$) of thickness of the liquid crystal layer (d) and optical anisotropy ($\Delta n$) should be set smaller. For this reason, $\Delta n$ required for the liquid crystals of the reflection TN-type AM-LCD is 0.07 and less compared to 0.075~0.120 of $\Delta n$ required for the liquid crystals of a conventional transmission TN-type AM-LCD.

Besides $\Delta n$, characteristics of the liquid crystal composition required for the reflection-type AM-LCD are as follows, just like for the conventional transmission-type AM-LCD:

(1) to have high specific resistance and a large voltage holding ratio in order to keep high contrast of the LCD;

(2) to have a broad temperature range exhibiting a nematic phase in order to make outdoor use of the LCD possible, namely, to have a higher upper-limit of temperature exhibiting a nematic phase and a lowere lower-limit of temperature exhibiting a nematic phase;

(3) to have low threshold voltage in order to reduce electric power consumed in the LCD; and (4) to have low viscosity in order to accelerate display speed of the LCD.

Literature disclosing liquid crystal compounds or liquid crystal compositions which is thought to be applicable to the AM-LCD can be illustrated as follows: WO 96/23851, Japanese Patent Kokai Hei 9-71779 (1997), Japanese Patent Kokai Hei 9-110981 (1997), DE 19629812 A1 and WO 98/17664. However, the liquid crystal compositions disclosed in these literatures, as shown in the comparative examples of the present application, have deficiencies such as large $\Delta n$, a high lower-limit of temperature exhibiting a nematic phase in spite of $\Delta n$ being relatively small, or a small voltage holding ratio so that they are insufficient to use for the reflection-type AM-LCD.

Thus the liquid crystal compositions are always requested improvement though they have been keenly investigated depending on various purposes.

DISCLOSURE OF THE INVENTION

The object of the present invention is to provide a liquid crystal composition which has, in particular, a high upper-limit of temperature exhibiting a nematic phase, a low lower-limit of temperature exhibiting a nematic phase, and small optical anisotropy while satisfying general properties required for an AM-LCD.

The inventors of the present invention, after enthusiastic investigation of the liquid crystal composition using various liquid crystal compounds to solve these subjects, have found that the liquid crystal composition described in the present invention as shown later can be used for the reflection TN-type AM-LCD with possibility of displaying full color so that the object intended can be achieved. Followings are detailed explanation of the present invention.

The first of the present invention is a liquid crystal composition characterized in that it comprises at least one compound expressed by formula (1) as the first component, at least one compound expressed by formula (2) as the second component, and at least one compound expressed by either formula (3-1) or (3-2) as the third component.

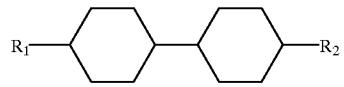

(1)

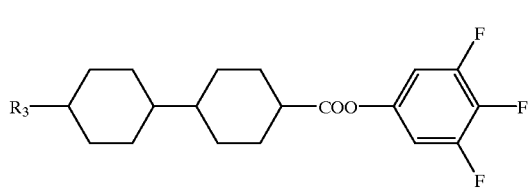

(2)

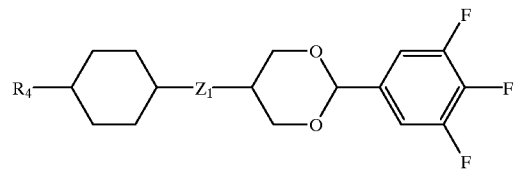

(3-1)

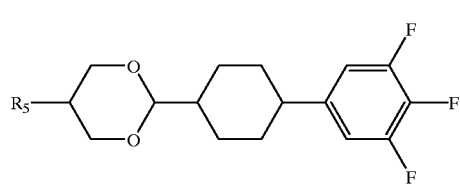

(3-2)

wherein $R_1$, $R_3$, $R_4$ and $R_5$ each independently represent alkyl having 1 to 10 carbon; $R_2$ represents alkyl or alkoxy having 1 to 10 carbon, or —COO—$R_6$; $Z_1$ represents a single bond or —$C_2H_4$—; and $R_6$ represents alkyl having 1 to 10 carbon.

The second of the present invention is a liquid crystal composition characterized in that it comprises as the first component at least one compound expressed by formula (1) in 5 to 95% by weight based on the total weight of the composition; it comprises as the second component at least one compound expressed by formula (2) in 5 to 25% by weight based on the total weight of the composition; and it comprises as the third component at least one compound expressed by either formula (3-1) or (3-2) in 5 to 70% by weight based on the total weight of the composition.

The third of the present invention is a liquid crystal composition characterized in that it comprises, as the fourth component in addition to the first, the second, and the third components, at least one compound selected from the group of compounds expressed by formulae (4-1) to (4-3) in 85% and less by weight based on the total weight of the composition.

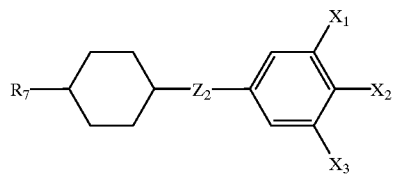
(4-1)

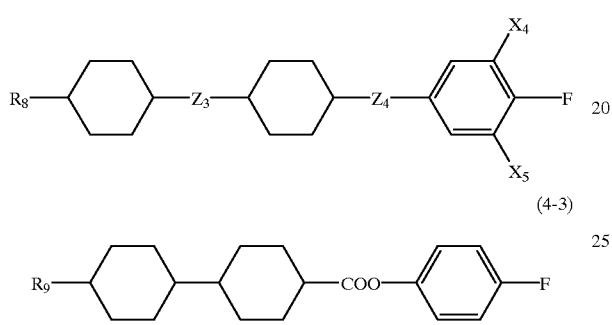
(4-2)

(4-3)
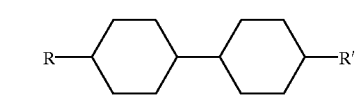

wherein $R_7$, $R_8$ and $R_9$ each independently represent alkyl having 1 to 10 carbon; $X_1$, $X_3$, $X_4$, and $X_5$ each independently represent H or F; $X_2$ represents Cl, F, or alkoxy having 1 to 10 carbon; $Z_2$ represents —COO—, —$C_2H_4$— or a single bond; $Z_3$ and $Z_4$ each independently represent —$C_2H_4$— or a single bond; with the proviso that $Z_2$ is always —COO— when $X_1$ and $X_3$ are H simultaneously.

The fourth of the present invention is a liquid crystal composition characterized in that an upper-limit of temperature exhibiting a nematic phase is 70° C. or more, a lower-limit of temperature exhibiting a nematic phase is −20° C. and less, and optical anisotropy is 0.07 and less.

The fifth of the present invention relates to a liquid crystal display device using any liquid crystal composition described in the first to the fourth of the present invention.

BEST EMBODIMENT TO PRACTICE THE PRESENT INVENTION

Now, we explain the preferable embodiment of compounds constituting the liquid crystal composition of the present invention. The compounds expressed by following formulae (1-1) to (1-3) are preferably used among those expressed by formula (1).

(1-1)
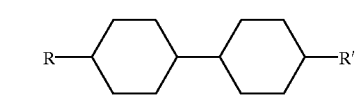

(1-2)
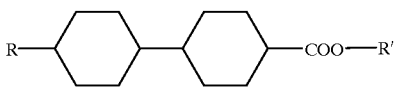

-continued
(1-3)
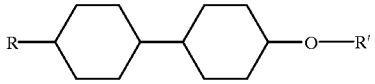

wherein R and R' each independently represent linear alkyl having 1 to 10 carbon.

The compounds expressed by following formula (2-1) are preferably used among those expressed by formula (2).

(2-1)
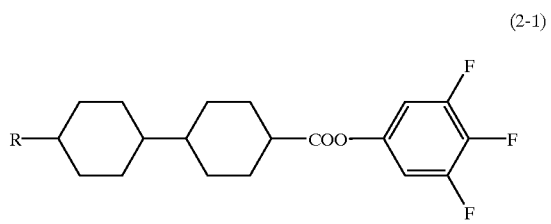

wherein R represents linear alkyl having 1 to 10 carbon.

The compounds expressed by following formula (3-1-1) or (3-1-2) are preferably used among those expressed by formula (3-1).

(3-1-1)
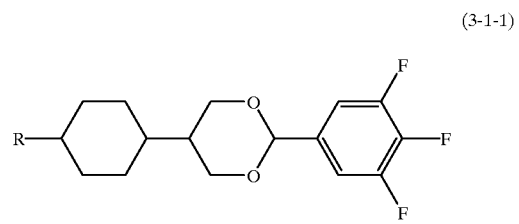

(3-1-2)
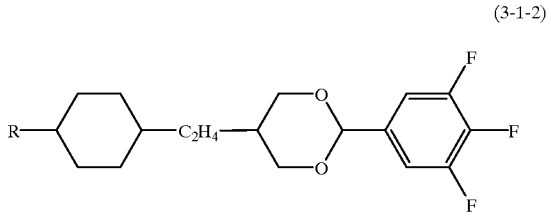

wherein R represents linear alkyl having 1 to 10 carbon.

The compounds expressed by the following formula (3-2-1) are preferably used among those expressed by formula (3-2).

(3-2-1)
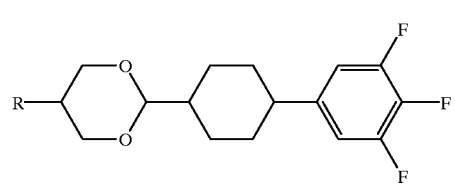

wherein R represents linear alkyl having 1 to 10 carbon.

The compounds expressed by the following formulae (4-1-1) to (4-1-7) are preferably used among those expressed by formula (4-1).

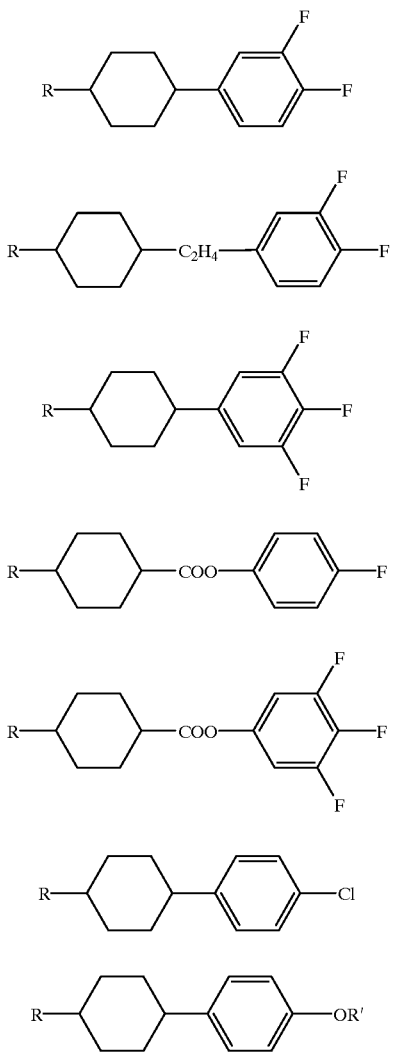

wherein R and R' each independently represent linear alkyl having 1 to 10 carbon.

The compounds expressed by following formulae (4-2-1) to (4-2-5) are preferably used among those expressed by formula (4-2)

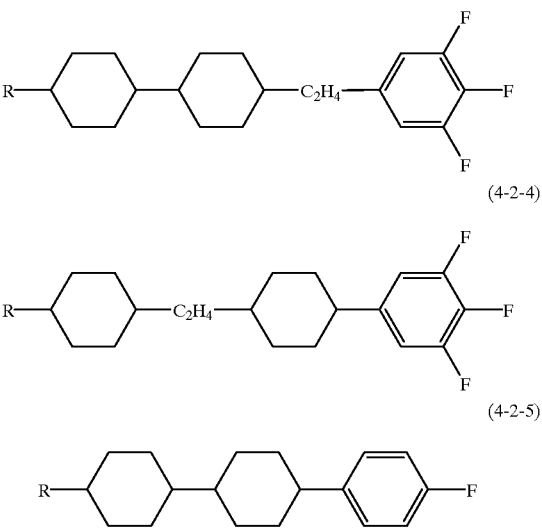

wherein R represents linear alkyl having 1 to 10 carbon.

The compounds expressed by the following formula (4-3-1) are preferably used among those expressed by formula (4-3).

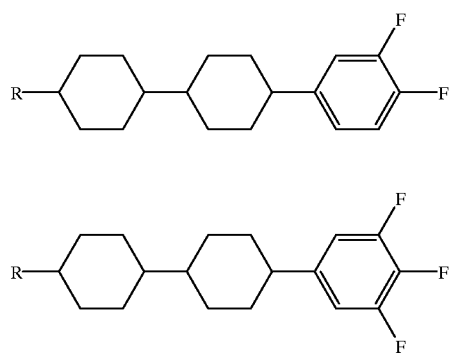

wherein R represents linear alkyl having 1 to 10 carbon.

Next, we explain a roll of each compound constituting the liquid crystal composition of the present invention.

The compound expressed by formula (1) has features that dielectric anisotropy is nearly zero, a value of specific resistance is large, the upper-limit of temperature exhibiting a nematic phase is relatively low, viscosity is low, and optical anisotropy is considerably small. For this reason, the compound expressed by formula (1) is specifically used for the object to reduce viscosity and to minimize optical anisotropy while maintaining a high voltage holding rate of the liquid crystal composition.

The compound expressed by formula (2) has features that dielectric anisotropy is large, a value of specific resistance is large, the upper-limit of temperature exhibiting a nematic phase is high, and optical anisotropy is relatively small. For this reason, the compound expressed by formula (2) is specifically used for the object to raise the upper-limit of temperature exhibiting a nematic phase and to lower threshold voltage, while maintaining high voltage holding rate and small optical anisotropy of the liquid crystal composition.

The compounds expressed by formulae (3-1) and (3-2) have larger dielectric anisotropy and a larger value of specific resistance than the compound expressed by formula (2). Also they have features that the upper-limit of temperature exhibiting a nematic phase is not higher than the compound expressed by formula (2) and is higher than the compound expressed by formula (1), and optical anisotropy is relatively small. For this reason, the compounds expressed by formulae (3-1) and (3-2) are specifically used for the object to further lower the threshold voltage, while maintaining a large voltage holding ratio and small optical anisotropy.

The combination of the compounds expressed by formulae (1), (2), and (3-1) or (3-2) makes possible to obtain the liquid crystal composition especially in which the upper-limit of temperature exhibiting a nematic phase is high, the lower-limit of temperature exhibiting a nematic phase is low, and optical anisotropy is small, while satisfying general features of the present invention which is required for the AM-LCD.

For example, the compositions composed only of the compounds expressed by formula (1), only of the compounds expressed by formula (2), and only of the compounds expressed by formula (3-1) or (3-2) are all not able to achieve the object of the present invention. The compositions composed only of the combination of the compounds expressed by formula (1) and the compounds expressed by formula (2), only of the combination of the compounds expressed by formula(l) and the compounds expressed by formula (3-1) or (3-2), and only of the combination of the compounds expressed by formula (2) and the compounds expressed by formula (3-1) or (3-2), can not be the composition having in particular the low lower-limit of temperature exhibiting a nematic phase which is the purpose of the present invention.

The compound expressed by formula (4-1) has zero or positive dielectric anisotropy, a large value of specific resistance, and relatively small optical anisotropy. The compound has a feature to suppress the exhibition of a smectic phase at low temperature by the addition of it to a liquid crystal composition. For this reason, the compound expressed by formula (4-1) can be used for the object particularly to adjust the lower-limit of temperature exhibiting a nematic phase or to adjust the threshold voltage, while maintaining a large voltage holding ratio and small optical anisotropy of the liquid crystal composition.

The compound expressed by formula (4-2) has features that dielectric anisotropy is relatively large, a value of specific resistance is high, the upper-limit of temperature exhibiting a nematic phase is relatively high, and optical anisotropy is relatively small. For this reason, the compound expressed by formula (4-2) of the present invention can be used for the object particularly to raise the upper-limit of temperature exhibiting a nematic phase and to further lower threshold voltage, while maintaining a large voltage holding ratio and small optical anisotropy.

The compound expressed by formula (4-3) has features that dielectric anisotropy is relatively large, a value of specific resistance is large, the upper-limit of temperature exhibiting a nematic phase is relatively high, and optical anisotropy is relatively small. For this reason, the compound expressed by formula (4-3) can be used for the object particularly to further raise the upper-limit of temperature exhibiting a nematic phase, and to control threshold voltage, while maintaining large voltage holding ratio and small optical anisotropy.

Next, we explain a preferable ratio of the components constituting the liquid crystal composition of the present invention and the reason thereof.

The compound expressed by formula (1) may sometimes raise the lower-limit of temperature exhibiting a nematic phase in the liquid crystal composition when a large amount of it exists in the composition. For this reason, the ratio of the compound expressed by formula (1) in the composition is preferably 95% and less by weight, more preferably 75% and less by weight, and further more preferably 65% and less by weight, respectively, based on the total weight of the liquid crystal composition. In order to minimize the optical anisotropy of the liquid crystal composition, the ratio of the compound expressed by formula (1) in the liquid crystal composition is preferably 5% or more by weight, more preferably 10% or more by weight, respectively, based on the total weight of the liquid crystal composition. In order to minimize optical anisotropy of the liquid crystal composition and to reduce viscosity, the ratio of the compound expressed by formula (1) is further more preferably 20% or more by weight based on the total weight of the liquid crystal composition.

The compound expressed by formula (2) may sometimes raise the lower-limit of temperature exhibiting a nematic phase when a large quantity of it exists in the composition. For this reason, the ratio of the compound expressed by formula (2) in the composition is preferably 25% and less by weight, and more preferably 20% and less by weight, respectively, based on the total weight of the liquid crystal composition. In order to relatively lower threshold voltage of liquid crystal composition and to raise the upper-limit of temperature exhibiting a nematic phase, the ratio of the compound expressed by formula (2) in the liquid crystal composition is preferably 5% or more by weight based on the total weight of the liquid crystal composition.

The compound expressed by formula (3-1) and the compound expressed by formula (3-2) may sometimes raise the lower-limit of temperature exhibiting a nematic phase when a large amount of it exists in the composition. For this reason, the ratio of the compound expressed by formula (3-1) or (3-2) in the liquid crystal composition is preferably 70% and less by weight, more preferably 60% and less by weight, and further more preferably 50% and less by weight, respectively based on the total weight of the liquid crystal composition. In order to further lower the threshold voltage of liquid crystal composition and to lower the lower-limit of temperature exhibiting a nematic phase, the ratio of the compound expressed by formula (3-1) or (3-2) in the liquid crystal composition is preferably 5% or more by weight based on the total weight of the liquid crystal composition.

In the use of a forth component in the liquid crystal composition of the present invention, the compound expressed by formulae (4-1) to (4-3) may raise the lower-limit of temperature exhibiting a nematic phase when a large amount of it exists in the liquid crystal composition. For this reason, the ratio of the compound expressed by formulae (4-1) to (4-3) in the liquid crystal composition is preferably 85% and less by weight, more preferably 65% and less by weight, and further more preferably 55% and less by weight in order to minimize optical anisotropy of the liquid crystal composition and to further lower the lower limit of temperature exhibiting a nematic phase, respectively based on the total weight of the liquid crystal composition.

Next, we explain in detail physical properties of the compositions which is constituting the present invention.

A display using liquid crystal composition having the upper-limit of temperature exhibiting a nematic phase lower than 70° C. and the lower-limit of temperature exhibiting a nematic phase higher than −20° C. has limitation as to the surrounding temperature for use. The display may lose its function, because it becomes unable to display especially in case of outdoor use. For this reason, the nematic phase range of the liquid crystal composition is preferably 70° C. or more for the upper-limit of temperature of 70° C. and −20° C. and less for the lower-limit of temperature.

In case of using a liquid crystal composition having optical anisotropy larger than 0.07 measured at 25° C. and using wave length of 589 nm, display in white may become a little yellow in the reflection-type AM-LCD. For this reason, optical anisotropy would be preferably 0.07 and less.

All compounds used in the liquid crystal composition of the present invention are known. For example, the compounds of formula (1-2) are described on their synthetic method in Japanese Patent Kokai Syo 58-170733 (1983). Japanese Patent Kokai Hci 2-233626 (1990) describes the synthetic method for the compounds expressed by formula (2-1) as an example of the compounds expressed by formula (2), for the compounds expressed by formula (3-1-1) as an example of the compounds expressed by formula (3-1), for the compounds expressed by formula (3-2-1) as an example of compounds expressed by formula (3-2), for the compounds expressed by formula (4-1-5) as an example of compounds expressed by formula (4-1), and for the compounds expressed by formula (4-2-2) as an example of the compounds expressed by formula (4-2), respectively. Japanese Patent Kokai Syo 56-135445 (1981) describes the synthetic method for the compound expressed by formula (4-3-1) as an example of the compounds expressed by formula (4-3). As illustrated above, each compound constituting the composition of the present invention could be synthesized by referring prior reference.

The liquid crystal composition of the present invention may comprise liquid crystal compounds except those expressed by formulae mentioned above in such a suitable range that the object of the present invention is not spoiled. The liquid crystal composition of the present invention is prepared by a conventional method. The method is generally mixing various compounds and dissolving each other at high temperature. A chiral dopant such as cholesteric nonanoate may be added to the liquid crystal composition of the present invention, for purposes of adjusting a necessary twist angle which is formed by inducing a spiral structure to a liquid crystal molecule. The liquid crystal composition of the present invention can also be used for guest-host mode by adding dichroic dye such as melocyanines, styrils, azos, azomethines, azoxys, quinophthalones, anthraquinones, and tetrazines; or can also be used for a polymer-dispersion type liquid crystal display device or for a birefringence controlling mode, and dynamic scattering mode; or can also be used for in-plane switching system.

EXAMPLE

We explain the present invention in detail via examples. However, the present invention is not restricted by the examples described below. All of composition ratio shown in Examples and Comparative Examples are represented in percentage by weight. Compounds used in Examples and Comparative Examples are expressed by the symbols based on the definitions shown in Table 1.

Characteristics of liquid crystal compositions are described by $T_{NI}$ as an upper-limit of temperature exhibiting a nematic phase, $T_C$ as a lower-limit of temperature exhibiting a nematic phase, η as viscosity, Δn as optical anisotropy, Vth as threshold voltage, and VHR as a voltage holding ratio.

$T_{NI}$ was obtained by measuring temperature changing from a nematic phase to isotropic liquid in the increasing temperature, using polarized light microscope.

$T_C$ was judged from the change of a liquid crystal phase after the liquid crystal composition was left for 30 days in the freezers each set at 10° C., 0° C., −10° C., −20° C., −30° C., and −40° C. For example, if a liquid crystal composition was a nematic state at −20° C. and changed to crystallized or to a smectic state at −30° C., $T_C$ of the liquid crystal composition is expressed as <−20° C.

η was measured at 20° C.

Δn was measured at 25° C. using a light source having wave length of 589 nm. Vth was measured a value of applied voltage at 25° C. at which the transmission ratio of light being transmitting the cell became 90% in a cell having cell gap of (0.4/Δn) μm, having a twist angle of 80°, and being applied a rectangular wave of 32 Hz frequency in normally white mode.

VHR was obtained by an area method at 25° C.

TABLE 1

Method for Designating Compounds by Using Symbols

R(A₁)—Z₁— ... —Zₙ—(Aₙ)—X

| 1) Left side terminal group R— | Symbol |
|---|---|
| $C_nH_{2n+1}$— | n— |

| 2) Ring structure —(A₁)—, —(Aₙ)— | Symbol |
|---|---|
|  | H |
|  | B |
| 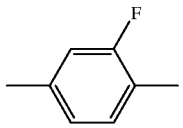 | B(F) |
| 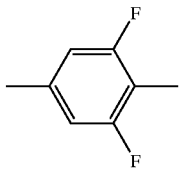 | B(F,F) |
| 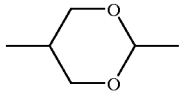 | D |

| 3) Bonding group —Z₁—, —Zₙ— | Symbol |
|---|---|
| —C₂H₄— | 2 |
| —COO— | E |

| 4) Right side terminal group —X | Symbol |
|---|---|
| —F | —F |
| —$C_nH_{2n+1}$ | —n |
| —Cl | —CL |
| —OCF₃ | —OCF3 |
| —OC$_n$H$_{2n+1}$ | —On |
| —COOCH₃ | —EMe |

5) Example

Example 1
3-HHEB(F,F)-F;

TABLE 1-continued

Method for Designating Compounds by Using Symbols $$R(A_1)-Z_1-\ldots-Z_{\overline{n}}-(A_n)-X$$

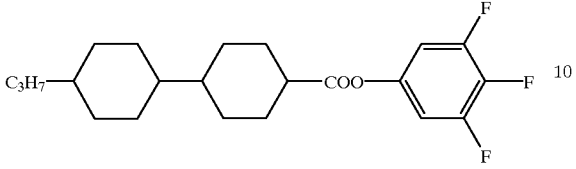

Example 2
3-HHB(F,F)-F;

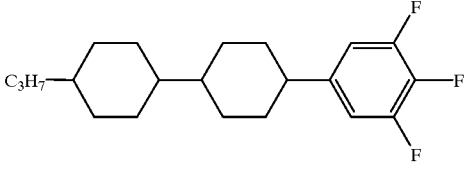

Example 3
3-HH-EMe;

Comparative Example 1

Among the compositions disclosed in WO 96/23851, the composition in Example 19 which is composed only of compounds having no CN group in the terminal and has minimum Δn, was prepared.

| 2-HHB (F,F)-F | 16% |
| 3-HHB (F,F)-F | 12% |
| 5-HHB (F,F)-F | 6% |
| 2-HHB -OCF3 | 16% |
| 3-HHB -OCF3 | 10% |
| 2-HDB (F,F)-F | 10% |
| 3-HDB (F,F)-F | 8% |
| 3-HH-4 | 10% |
| 3-HH-5 | 8% |
| 7-HB-F | 4% |

Characteristics of the above composition were as follows:

$T_C$<0° C.

$T_{NI}$=78.0° C.

η=17.0 mPa·s

Δn=0.066

Vth=1.22 V

VHR=98.3%

This composition has a drawback of high $T_C$ point though it has small Δn.

Comparative Example 2

Among compositions disclosed in Japanese Patent Kokai Hei 9-71779 (1997), the composition appeared in Example 2 which has high $T_{NI}$ and minimum Δn, was prepared.

| 5-HB-CL | 10% |
| 2-HBEB (F,F)-F | 2% |
| 3-HBEB (F,F)-F | 2% |
| 5-HBEB (F,F)-F | 1% |
| 3-HB-02 | 6% |
| 3-HH-4 | 12% |
| 3-HHB-1 | 7% |
| 3-HHB-F | 4% |
| 2-HHB (F)-F | 9% |
| 3-HHB (F)-F | 9% |
| 5-HHB (F)-F | 10% |
| 2-HBB (F)-F | 4% |
| 3-HBB (F)-F | 5% |
| 5-HBB (F)-F | 9% |
| 3-HHEB-F | 5% |
| 5-HHEB-F | 5% |

Characteristics of the above composition were as follows:

$T_C$<-40° C.

$T_{NI}$=96.4° C.

η=18.0 mPa·s

Δn=0.091

Vth=2.18V

VHR=98.5%

This composition has a drawback of large Δn.

Comparative Example 3

Among compositions disclosed in Japanese Patent Kokai Hei 9-110981 (1997), the following composition appeared in Table 5 which has the smallest Δn was prepared.

| 7-HB (F,F)-F | 4.0% |
| 2-HHB (F)-F | 15.0% |
| 3-HHB (F)-F | 15.0% |
| 5-HHB (F)-F | 15.0% |
| 2-H2HB (F)-F | 9.2% |
| 3-H2HB (F)-F | 4.6% |
| 5-H2HB (F)-F | 9.2% |
| 3-HHB-F | 4.0% |
| 2-HHB (F,F)-F | 4.0% |
| 3-HHB (F,F)-F | 5.0% |
| 3-HHEBB-F | 4.0% |
| 5-HHEBB-F | 3.0% |
| 3-HHB-1 | 8.0% |

Characteristics of the above composition were as follows:

$T_C$<-10° C.

$T_{NI}$=118.3° C.

η=26.4 mPa·s

Δn=0.083

Vth=2.00V

VHR=98.2%

This composition has drawbacks of large Δn and high $T_C$ point.

Comparative Example 4

Among compounds disclosed in DE 19629812 A1, the following composition appeared in Ex. H was prepared as a composition resembling the present application.

| | |
|---|---|
| 7-HB-F | 1.5% |
| 2-HHB (F,F)-F | 8.0% |
| 3-HHB (F,F)-F | 10.0% |
| 5-HHB (F,F)-F | 5.0% |
| 2-HHB-OCF3 | 9.0% |
| 3-HHB-OCF3 | 6.0% |
| 5-HHB-OCF3 | 4.0% |
| 2-HB (F) B (F,F)-F | 9.0% |
| 3-HB (F) B (F,F)-F | 8.5% |
| 5-HB (F) B (F,F)-F | 10.0% |
| 3-HH-5 | 6.0% |
| 2-HHEB (F,F)-F | 3.0% |
| 3-HHEB (F,F)-F | 18.0% |
| 5-HHEB (F,F)-F | 2.0% |

Characteristics of the above composition were as follows:

$T_C < -10°$ C.
$T_{NI} = 77.0°$ C.
$\eta = 19.0$ mPa·s
$\Delta n = 0.086$
Vth = 1.17V
VHR = 98.1%

This composition has drawback of large $\Delta n$ and high $T_C$ point.

Example 1

A composition consisting of the following components was prepared:

| | |
|---|---|
| First component | |
| 3-HH-4 | 5% |
| 3-HH-EMe | 30% |
| 5-HH-EMe | 15% |
| Second component | |
| 3-HHEB (F,F)-F | 10% |
| 4-HHEB (F,F)-F | 4% |
| 5-HHEB (F,F)-F | 4% |
| Third component | |
| 2-HDB (F,F)-F | 6% |
| 3-HDB (F,F)-F | 6% |
| 4-HDB (F,F)-F | 6% |
| 5-HDB (F,F)-F | 5% |
| 2-H2DB (F,F)-F | 4% |
| 3-H2DB (F,F)-F | 5% |

Characteristics of this composition were as follows:

$T_C < -20°$ C.
$T_{NI} = 79.1°$ C.
$\eta = 22.9$ mPa·s
$\Delta n = 0.061$
Vth = 1.64V
VHR = 98.4%

This composition has a large VHR, high $T_{NI}$, a low $T_C$ point and small $\Delta n$.

Example 2

A composition consisting of the following components as prepared:

| | |
|---|---|
| First component | |
| 3-HH-4 | 11% |
| 3-HH-EMe | 29% |
| 5-HH-EMe | 10% |
| Second component | |
| 3-HHEB (F,F)-F | 10% |
| 4-HHEB (F,F)-F | 4% |
| 5-HHEB (F,F)-F | 4% |
| Third component | |
| 2-HDB (F,F)-F | 8% |
| 3-HDB (F,F)-F | 8% |
| 4-HDB (F,F)-F | 8% |
| 5-HDB (F,F)-F | 8% |

Characteristics of this composition were as follows:

$T_C < -20°$ C.
$T_{NI} = 80.1°$ C.
$\eta = 20.3$ mPa·s
$\Delta n = 0.061$
Vth = 1.58V
VHR = 98.4%

This composition has a large VHR, high $T_{NI}$, a low $T_C$ point and small $\Delta n$.

Example 3

A composition consisting of the following components was prepared:

| | |
|---|---|
| First component | |
| 5-HH-O1 | 5% |
| 3-HH-EMe | 30% |
| 5-HH-EMe | 15% |
| Second component | |
| 3-HHEB (F,F)-F | 10% |
| 4-HHEB (F,F)-F | 4% |
| 5-HHEB (F,F)-F | 4% |
| Third component | |
| 2-HDB (F,F)-F | 6% |
| 3-HDB (F,F)-F | 6% |
| 4-HDB (F,F)-F | 6% |
| 5-HDB (F,F)-F | 5% |
| 2-H2DB (F,F)-F | 4% |
| 3-H2DB (F,F)-F | 5% |

Characteristics of this composition were as follows:

$T_C < -20°$ C.
$T_{NI} = 78.20°$ C.
$\eta = 22.1$ mPa·s
$\Delta n = 0.061$
Vth = 1.62V
VHR = 98.4%

This composition has a large VHR, high $T_{NI}$, a low $T_C$ point, and small $\Delta n$.

Example 4

A composition consisting of the following components was prepared:

| First component | |
|---|---|
| 3-HH-4 | 11% |
| 3-HH-EMe | 29% |
| 5-HH-EMe | 10% |
| Second component | |
| 3-HHEB (F,F)-F | 10% |
| 4-HHEB (F,F)-F | 4% |
| 5-HHEB (F,F)-F | 4% |
| Third component | |
| 2-HDB (F,F)-F | 6% |
| 3-HDB (F,F)-F | 7% |
| 4-HDB (F,F)-F | 7% |
| 5-HDB (F,F)-F | 7% |
| 5-DHB (F,F)-F | 5% |

Characteristics of the above composition were as follows:
$T_C < -20°$ C.
$T_{NI} = 78.5°$ C.
$\eta = 21.3$ mPa·s
$\Delta n = 0.062$
Vth = 1.48V
VHR = 98.5%

This composition has a large VHR, high $T_{NI}$, a low $T_C$ point and small $\Delta n$.

Example 5

A composition consisting of the following component was prepared:

| First component | |
|---|---|
| 3-HH-4 | 8% |
| 3-HH-EMe | 12% |
| Second component | |
| 3-HHEB (F,F)-F | 10% |
| 4-HHEB (F,F)-F | 4% |
| Third component | |
| 2-HDB (F,F)-F | 6% |
| 3-HDB (F,F)-F | 6% |
| 4-HDB (F,F)-F | 6% |
| Fourth component | |
| 5-HEB-F | 9% |
| 7-HEB-F | 10% |
| 3-H2HB (F,F)-F | 10% |
| 3-HHEB-F | 5% |
| 5-HHEB-F | 4% |
| 3-HH2B (F,F)-F | 5% |
| 3-HHB (F,F)-F | 5% |

Characteristics of this composition were as follows:
$T_C < -20°$ C.
$T_{NI} = 81.7°$ C.
$\eta = 22.2$ mPa·s
$\Delta n = 0.065$
Vth = 1.45V
VHR = 98.5%

This composition has a large VHR, high $T_{NI}$, a low $T_C$ point and small $\Delta n$.

Example 6

A composition consisting of the following components was prepared:

| First component | |
|---|---|
| 3-HH-4 | 8% |
| 3-HH-EMe | 23% |
| 5-HH-EMe | 8% |
| Second component | |
| 3-HHEB (F,F)-F | 10% |
| 4-HHEB (F,F)-F | 4% |
| 5-HHEB (F,F)-F | 4% |
| Third component | |
| 2-HDB (F,F)-F | 5% |
| 3-HDB (F,F)-F | 4% |
| 2-H2DB (F,F)-F | 6% |
| 3-H2DB (F,F)-F | 7% |
| 4-H2DB (F,F)-F | 4% |
| Fourth component | |
| 5-HEB-F | 5% |
| 7-HEB-F | 5% |
| 3-HHEB-F | 5% |
| 5-HHEB-F | 2% |

Characteristics of this composition were as follows:
$T_C < -20°$ C.
$T_{NI} = 76.0°$ C.
$\eta = 21.9$ mPa·s
$\Delta n = 0.062$
Vth = 1.63V
VHR = 98.3%

This composition has a large VHR, high $T_{NI}$, a low $T_C$ point and small $\Delta n$.

Example 7

A composition consisting of the following components was prepared:

| First component | |
|---|---|
| 3-HH-4 | 12% |
| 3-HH-EMe | 22% |
| Second component | |
| 3-HHEB (F,F)-F | 10% |
| 4-HHEB (F,F)-F | 4% |
| Third component | |
| 3-HDB (F,F)-F | 6% |
| 4-HDB (F,F)-F | 5% |
| 5-HDB (F,F)-F | 6% |
| 2-H2DB (F,F)-F | 4% |
| 3-H2DB (F,F)-F | 5% |
| Fourth component | |
| 7-HB (F)-F | 10% |
| 3-HHEB-F | 8% |
| 5-HHEB-F | 8% |

Characteristics of this composition were as follows:
$T_C < -20°$ C.
$T_{NI} = 80.2°$ C.
$\eta = 18.4$ mPa·s
$\Delta n = 0.063$ Vth=1.63V
VHR=98.4%
This composition has a large VHR, high $T_{NI}$, a low $T_C$ point and small $\Delta n$.

Example 8

A composition consisting of the following components was prepared:

| First component | |
|---|---|
| 3-HH-4 | 5% |
| 2-HH-EMe | 13% |
| 3-HH-EMe | 21% |
| Second component | |
| 3-HHEB (F,F)-F | 10% |
| 4-HHEB (F,F)-F | 4% |
| 5-HHEB (F,F)-F | 4% |
| Third component | |
| 3-HDB (F,F)-F | 6% |
| 4-HDB (F,F)-F | 6% |
| 2-H2DB (F,F)-F | 4% |
| 3-H2DB (F,F)-F | 4% |
| Fourth component | |
| 3-H2HB (F,F)-F | 7% |
| 3-HHEB-F | 8% |
| 5-HHEB-F | 8% |

Characteristics of this composition were as follows
$T_C$<-20° C.
$T_{NI}$=89.30° C.
$\eta$=23.0 mPa·s
$\Delta n$=0.064
Vth=1.74V
VHR=98.4%
This composition has a large VHR, high $T_{NI}$, a low $T_C$ point and small $\Delta n$.

Example 9

A composition consisting of the following components was prepared:

| First component | |
|---|---|
| 2-HH-EMe | 25% |
| 3-HH-EMe | 25% |
| 5-HH-EMe | 10% |
| Second component | |
| 3-HHEB (F,F)-F | 10% |
| 4-HHEB (F,F)-F | 3% |
| 5-HHEB (F,F)-F | 3% |
| Third component | |
| 3-HDB (F,F)-F | 4% |
| 4-HDB (F,F)-F | 3% |
| 5-HDB (F,F)-F | 4% |
| Fourth component | |
| 3-HHB (F)-F | 3% |
| 3-HHEB-F | 5% |
| 5-HHEB-F | 5% |

Characteristics of this composition were as follows:
$T_C$<-30° C.
$T_{NI}$=80.1° C.
$\eta$=17.3 mPa·s
$\Delta n$=0.059
Vth=2.17V
VHR=98.3%
This composition has a large VHR, high $T_{NI}$, a low $T_C$ point and small $\Delta n$.

Example 10

A composition consisting of the following components was prepared:

| First component | |
|---|---|
| 3-HH-4 | 11% |
| 2-HH-EMe | 16% |
| 3-HH-EMe | 11% |
| Second component | |
| 3-HHEB (F,F)-F | 10% |
| 4-HHEB (F,F)-F | 4% |
| Third component | |
| 2-HDB (F,F)-F | 8% |
| 3-HDB (F,F)-F | 6% |
| 4-HDB (F,F)-F | 6% |
| 5-HDB (F,F)-F | 6% |
| Fourth component | |
| 5-HEB-F | 4% |
| 7-HEB-F | 3% |
| 3-HHEB-F | 8% |
| 5-HHEB-F | 7% |

Characteristics of this composition were as follows:
$T_C$<-30° C.
$T_{NI}$=79.8° C.
$\eta$=19.4 mPa·s
$\Delta n$=0.061
Vth=1.58V
VHR=98.5%
This composition has a large VHR, high $T_{NI}$, a low $T_C$ point and small $\Delta n$.

Example 11

A composition consisting of the following components was prepared:

| First component | |
|---|---|
| 3-HH-4 | 11% |
| 2-HH-EMe | 15% |
| 3-HH-EMe | 14% |
| 5-HH-EMe | 8% |
| Second component | |
| 3-HHEB (F,F)-F | 10% |
| 4-HHEB (F,F)-F | 4% |
| 5-HHEB (F,F)-F | 4% |
| Third component | |
| 2-HDB (F,F)-F | 8% |
| 3-HDB (F,F)-F | 8% |

-continued

| | |
|---|---|
| 4-HDB (F,F)-F | 8% |
| 5-HDB (F,F)-F | 8% |
| Fourth component | |
| 3-HHEB-F | 2% |

Characteristics of this composition were as follows:

$T_C < -40°$ C.
$T_{NI} = 75.3°$ C.
$\eta = 19.0$ mPa·s
$\Delta n = 0.060$
Vth=1.47V
VHR=98.7%

This composition has a large VHR, high $T_{NI}$, a low $T_C$ point and small $\Delta n$.

Example 12

A composition consisting of the following components was prepared:

| | |
|---|---|
| First component | |
| 3-HH-EMe | 25% |
| 5-HH-EMe | 10% |
| Second component | |
| 3-HHEB (F,F)-F | 8% |
| Third component | |
| 2-HDB (F,F)-F | 6% |
| 3-HDB (F,F)-F | 3% |
| 4-HDB (F,F)-F | 4% |
| 5-HDB (F,F)-F | 7% |
| 2-H2DB (F,F)-F | 4% |
| 3-H2DB (F,F)-F | 6% |
| 4-H2DB (F,F)-F | 4% |
| 5-DHB (F,F)-F | 10% |
| Fourth component | |
| 5-HEB (F,F)-F | 6% |
| 3-HHEB-F | 4% |
| 5-HHEB-F | 3% |

Characteristics of this composition were as follows:

$T_C < -30°$ C.
$T_{NI} = 71.0°$ C.
$\eta = 24.8$ mPa·s
$\Delta n = 0.062$
Vth=1.22V
VHR=98.4%

This composition has a large VHR, high $T_{NI}$, a low $T_C$ point and small $\Delta n$.

Example 13

A composition consisting of the following components was prepared:

| | |
|---|---|
| First component | |
| 3-HH-4 | 6% |
| Second component | |
| 3-HHEB (F,F)-F | 10% |
| 4-HHEB (F,F)-F | 3% |
| 5-HHEB (F,F)-F | 3% |
| Third component | |
| 3-HDB (F,F)-F | 5% |
| 4-HDB (F,F)-F | 5% |
| 5-HDB (F,F)-F | 5% |
| 4-DHB (F,F)-F | 12% |
| 5-DHB (F,F)-F | 20% |
| Fourth component | |
| 7-HB (F,F)-F | 4% |
| 3-H2HB (F,F)-F | 10% |
| 4-H2HB (F,F)-F | 7% |
| 3-HHEB-F | 5% |
| 5-HHEB-F | 5% |

Characteristics of this composition were as follows:
$T_C < -20°$ C.
$T_{NI} = 71.0°$ C.
$\eta = 38.3$ mPa·s
$\Delta n = 0.065$
Vth=0.90V
VHR=98.2%

This composition has a large VHR, high $T_{NI}$, a low $T_C$ point and small $\Delta n$.

Example 14

A composition consisting of the following components was prepared:

| | |
|---|---|
| First component | |
| 3-HH-4 | 9% |
| 3-HH-EMe | 23% |
| Second component | |
| 3-HHEB (F,F)-F | 10% |
| 4-HHEB (F,F)-F | 5% |
| Third component | |
| 4-HDB (F,F)-F | 5% |
| 5-HDB (F,F)-F | 6% |
| 2-H2DB (F,F)-F | 4% |
| 3-H2DB (F,F)-F | 5% |
| 5-DHB (F,F)-F | 7% |
| Fourth component | |
| 7-HB (F) -F | 7% |
| 5-HB-CL | 3% |
| 3-HHEB-F | 8% |
| 5-HHEB-F | 8% |

Characteristics of this composition were as follows:
$T_C < -30°$ C.
$T_{NI} = 79.4°$ C.
$\eta = 19.9$ mPa·s
$\Delta n = 0.064$ Vth=1.50V
VHR=98.4%

This composition has a large VHR, high $T_{NI}$, a low $T_C$ point and small $\Delta n$.

Example 15

A composition consisting of the following components was prepared:

| First component | |
|---|---|
| 3-HH-4 | 7% |
| 3-HH-EMe | 26% |
| Second component | |
| 3-HHEB (F,F)-F | 10% |
| 4-HHEB (F,F)-F | 4% |
| Third component | |
| 3-HDB (F,F)-F | 6% |
| 4-HDB (F,F)-F | 6% |
| 5-HDB (F,F)-F | 6% |
| 2-H2DB (F,F)-F | 4% |
| 3-H2DB (F,F)-F | 4% |
| Fourth component | |
| 5-H2B (F)-F | 6% |
| 3-HB-O2 | 5% |
| 3-HHB-F | 3% |
| 3-HHEB-F | 8% |
| 5-HHEB-F | 5% |

Characteristics of this composition were as follows:
$T_C$<−20° C.
$T_{NI}$=85.1° C.
$\eta$=19.4 mPa·s
$\Delta n$=0.064
Vth=1.72V
VHR=98.6%

This composition has a large VHR, high $T_{NI}$, a low $T_C$ point and small $\Delta n$.

Example 16

A composition consisting of the following components was prepared:

| First component | |
|---|---|
| 3-HH-EMe | 30% |
| 5-HH-EMe | 15% |
| 3-HH-O1 | 20% |
| Second component | |
| 3-HHEB (F,F)-F | 9% |
| 4-HHEB (F,F)-F | 3% |
| 5-HHEB (F,F)-F | 3% |
| Third component | |
| 3-HDB (F,F)-F | 4% |
| 5-HDB (F,F)-F | 4% |
| Fourth component | |
| 3-HHEB-F | 6% |
| 5-HHEB-F | 6% |

Characteristics of this composition were as follows:
$T_C$<−20° C.
$T_{NI}$=79.2° C.
$\eta$=17.7 mPa·s
$\Delta n$=0.058
Vth=2.47V
VHR=98.3%

This composition has a large VHR, high $T_{NI}$, a low $T_C$ point and small $\Delta n$.

Example 17

A composition consisting of the following components was prepared:

| First component | |
|---|---|
| 3-HH-O1 | 25% |
| 3-HH-O2 | 8% |
| 5-HH-O2 | 10% |
| 7-HH-O1 | 7% |
| Second component | |
| 3-HHEB (F,F)-F | 7% |
| 4-HHEB (F,F)-F | 3% |
| 5-HHEB (F,F)-F | 3% |
| Third component | |
| 5-HDB (F,F)-F | 5% |
| Fourth component | |
| 2-HHB (F)-F | 8% |
| 3-HHB (F)-F | 7% |
| 5-HHB (F)-F | 7% |
| 3-HHEB-F | 5% |
| 5-HHEB-F | 5% |

Characteristics of this composition were as follows:
$T_C$<−30° C.
$T_{NI}$=72.6° C.
$\eta$=16.3 mPa·s
$\Delta n$=0.058
Vth=2.05V
VHR=98.4%

This composition has a large VHR, high $T_{NI}$, a low $T_C$ point and small $\Delta n$.

UTILIZATION POSSIBILITY IN THE INDUSTRY

According to the present invention, as shown in the examples, liquid crystal compositions which have in Particular the high upper-limit of temperature exhibiting a liquid crystal phase, low lower-limit of temperature exhibiting a liquid crystal phase together with small optical anisotropy while satisfying general properties required for the AM-LCD can be provided.

What is claimed is:

1. A liquid crystal composition comprising at least one compound expressed by formula (1) as the first component at least one compound expressed by formula (2) as the second component, and at least one compound expressed by either formula (3-1) or (3-2) as the third component

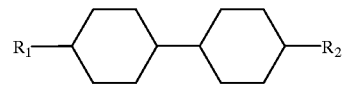

(1)

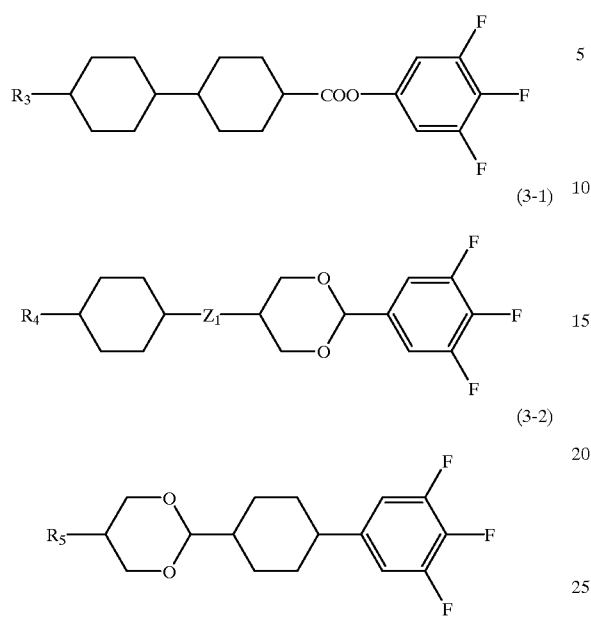

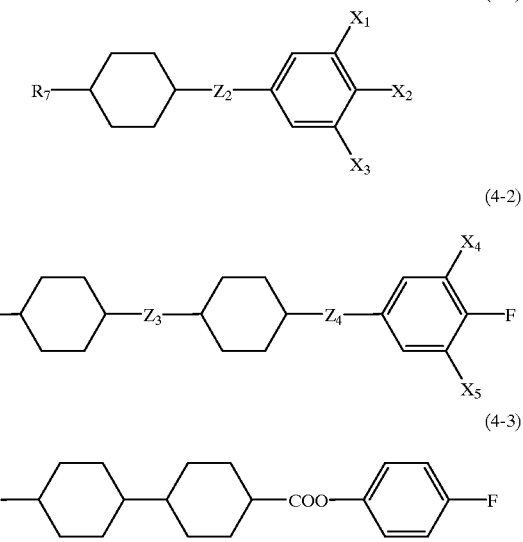

wherein $R^1$, $R_3$, $R^4$ and $R^5$ each independently represent alkyl having 1 to 10 carbon atoms; $R_2$ represents alkyl or alkoxy having 1 to 10 carbon atoms, or —COO—$R_6$ wherein $R_6$ represents alkyl having 1 to 10 carbon atoms; and $Z_1$ represents a single bond or —$C_2H_4$—.

2. The liquid crystal composition according to claim 1 comprising as the first component at least one compound expressed by formula (1) in an amount of 5 to 95% by weight based on the total weight of the composition, comprising as the second component at least one compound expressed by formula (2) in an amount of 5 to 25% by weight based on the total weight of the composition, and comprising as the third component at least one compound expressed by either formula (3-1) or (3-2) in an amount of 5 to 70% by weight based on the total weight of the composition.

3. The liquid crystal composition according to claim 1 or 2 wherein it comprises, as a fourth component in addition to the first, the second, and the third components, at least one compound selected from the group of compounds expressed by formulae (4-1) to (4-3) in an amount of 85% or less by weight based on the total weight of the composition wherein $R_7$, $R^8$ and $R^9$ each independently represent alkyl having 1 to 10 carbon atoms; $X_1$, $X_3$, $X_4$, and $X_5$ each independently represent H or F; $X_2$ represents Cl, F, or alkoxy having 1 to 10 carbon atoms; $Z_2$ represents —COO—, —$C_2H_4$— or a single bond; and $Z_3$ and $Z_4$ each independently represent —$C_2H_4$— or a single bond; with the proviso that $Z_2$ is always —COO— when $X_1$ and $X_3$ are H simultaneously.

4. The liquid crystal composition according to claim 1 or 2 wherein an upper-limit of temperature exhibiting a nematic phase is 70° C. or more, a lower-limit of temperature exhibiting a nematic phase is −20° C. or less, and optical anisotropy is 0.07 or less.

5. A liquid crystal display device comprising a liquid crystal composition described in claim 1 or 2.

6. The liquid crystal composition according to claim 3 wherein an upper-limit of temperature exhibiting a nematic phase is 70° C. or more, a lower-limit of temperature exhibiting a nematic phase is −20° C. or less, and optical anisotropy is 0.07 or less.

7. A liquid crystal display device comprising a liquid crystal composition described in claim 3.

8. A liquid crystal display device comprising a liquid crystal composition described in claim 4.

* * * * *